Feb. 23, 1937.   L. T. COOPER   2,072,028
HINGE
Filed March 23, 1936

INVENTOR.
LEROY T. COOPER,
BY
ATTORNEYS.

Patented Feb. 23, 1937

2,072,028

UNITED STATES PATENT OFFICE 2,072,028

HINGE

Leroy T. Cooper, Los Olivos, Calif.

Application March 23, 1936, Serial No. 70,524

1 Claim. (Cl. 16—163)

This invention relates to improvements in hinges, and has particular reference to a hinge peculiarly adapted to gates.

The principal object of this invention is to produce a hinge for a gate which will permit the gate to swing in either direction back against the fence and which will not leave a "pocket" in back of the gate when driving stock from either side of said gate.

A further object is to produce a hinge which is economical to manufacture and simple to install.

A still further object is to produce a device wherein the weaving action of the gate will not be transmitted to the hinges, thus permitting the top and bottom hinges to function in unison.

Other objects and advantages will be apparent during the course of the following description.

Figure 1:
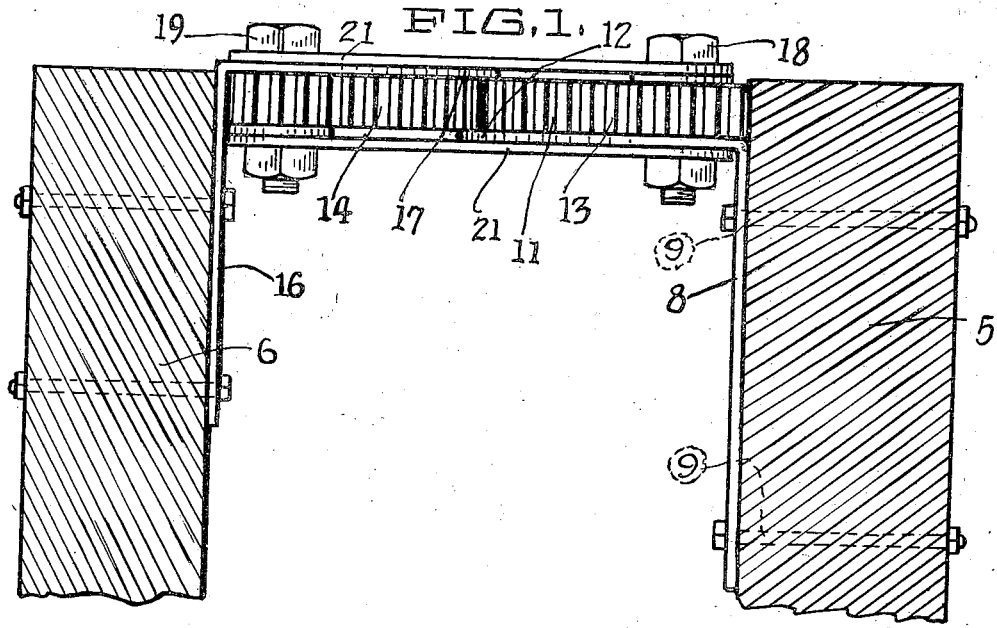
Figure 2:
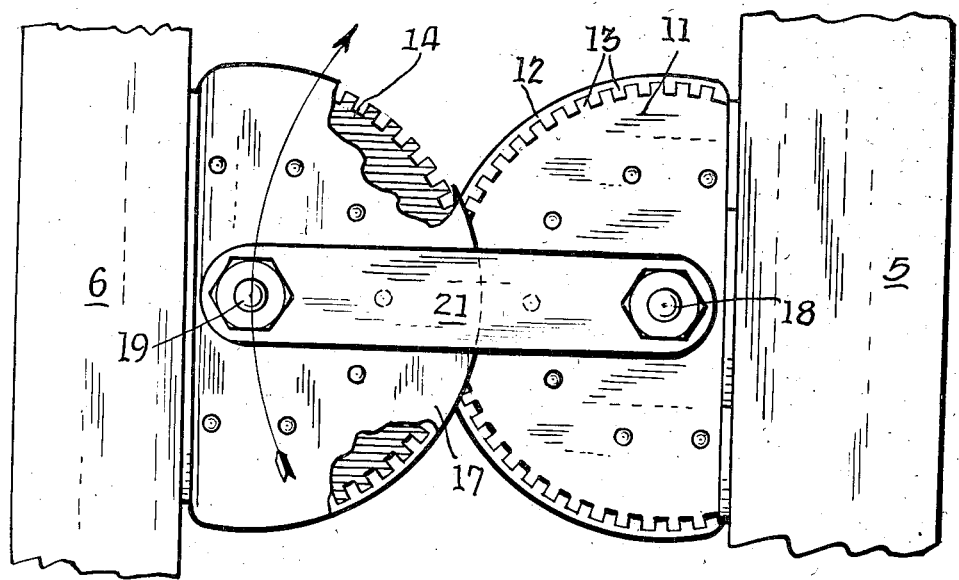

In the accompanying drawing forming a part of this specification and in which like numerals are employed to designate like parts throughout the same, Fig. 1 is a side elevation of my hinge, showing the support and the swinging gate in fragmentary cross section, and Fig. 2 is a top plan view of Fig. 1.

It often occurs that gates bind due to the weaving action of the gate, and this is particularly true in large gates.

Applicant has devised a hinge which will eliminate these difficulties and by referring to the drawing, the numeral 5 designates the ordinary fence post. The numeral 6 designates a portion of a gate, and it is between this post and gate that my hinge is positioned. The numeral 8 designates a bracket secured to the post 5 by bolts 9. Secured to this bracket is a segmental gear 11, having a flange 12 extending beyond the outer margin of the teeth 13 of the gear. A similar gear 14 is secured to the gate 6 through the medium of the bracket 16. The gear 14 carries a top flange 17, which is similar to the flange 12.

A pivot bolt 18 extends through the gear 11 and bracket 8. A similar pivot bolt 19 extends through the gear 14 and bracket 16. Straps 21 placed above and below the gears have their ends engaged by the bolts 18 and 19. The result of this construction is that when the device is arranged as shown in Fig. 1, the gate 6 may be moved either in the direction of the arrow, Fig. 2, or in the opposite direction and the gear 14 will roll about the gear 11 up to a point where the links 21 will be at right angles to the position shown in Fig. 2.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, the combination with a pair of gears, each of said gears having a single flange extending beyond the teeth of the gears, the gears being so arranged that the flange of one gear overlies the edge of the abutting gear and the flange of the abutting gear underlies the first mentioned gear, means for connecting said gears one to the other to maintain their teeth in operating relation, and means for supporting said gears on a support and gate, whereby said gate will move in relation to said gate support.

LEROY T. COOPER.